United States Patent
Vanstaan

(10) Patent No.: US 11,034,902 B2
(45) Date of Patent: *Jun. 15, 2021

(54) FUEL AND PROPELLANT COMPOSITION FOR COMBUSTION TOOLS

(71) Applicant: Illinois Tool Works Inc., Glenview, IL (US)

(72) Inventor: Valery H. Vanstaan, Highland Park, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/517,177

(22) Filed: Jul. 19, 2019

(65) Prior Publication Data

US 2019/0338206 A1    Nov. 7, 2019

Related U.S. Application Data

(63) Continuation of application No. 14/631,314, filed on Feb. 25, 2015, now Pat. No. 10,385,285.

(51) Int. Cl.
| | | |
|---|---|---|
| C10L 3/00 | (2006.01) | |
| C10L 3/12 | (2006.01) | |
| B25C 1/08 | (2006.01) | |
| C09K 3/30 | (2006.01) | |
| C10L 3/02 | (2006.01) | |
| C06B 47/00 | (2006.01) | |
| C06D 5/08 | (2006.01) | |

(52) U.S. Cl.
CPC .................. *C10L 3/00* (2013.01); *B25C 1/08* (2013.01); *C09K 3/30* (2013.01); *C10L 3/02* (2013.01); *C10L 3/12* (2013.01); *C06B 47/00* (2013.01); *C06D 5/08* (2013.01); *C10L 2270/08* (2013.01)

(58) Field of Classification Search
CPC ................... B25C 1/08; C10L 2270/08; F17C 2270/0545
See application file for complete search history.

(56) References Cited

U.S. PATENT DOCUMENTS

| | | | |
|---|---|---|---|
| 3,713,793 A | | 1/1973 | Maruyama |
| 3,850,359 A | | 11/1974 | Obergfell |
| 3,938,708 A | | 2/1976 | Burger |
| 3,955,509 A | | 5/1976 | Carlson |
| 3,981,692 A | * | 9/1976 | Seris .................. C10L 3/00 585/6 |

(Continued)

FOREIGN PATENT DOCUMENTS

| | | |
|---|---|---|
| EP | 1 093 889 | 4/2001 |
| EP | 1 666 571 | 6/2006 |
| EP | 2 119 535 | 11/2009 |

OTHER PUBLICATIONS

Australian Examination Report No. 1 for Australian Application No. 2015383869, dated Mar. 6, 2018 (3 pages).

(Continued)

*Primary Examiner* — Imran Akram
(74) *Attorney, Agent, or Firm* — Neal, Gerber & Eisenberg LLP

(57) ABSTRACT

A combustion tool fuel cell is provided having enhanced low temperature operation, including a fuel composition comprising at least one hydrocarbon component with a total vapor pressure equal or above 95 psig at 21° C.

6 Claims, 3 Drawing Sheets

(56) References Cited

U.S. PATENT DOCUMENTS

| | | |
|---|---|---|
| 4,403,722 A | 9/1983 | Nikolich |
| 4,483,474 A | 11/1984 | Nikolich |
| 4,522,162 A | 6/1985 | Nikolich |
| 5,088,526 A * | 2/1992 | Nash .................. B09B 3/0058 |
| | | 100/902 |
| 5,098,283 A * | 3/1992 | Clapp .................. F23D 11/443 |
| | | 126/39 G |
| 5,115,944 A | 5/1992 | Nikolich |
| 5,842,623 A | 12/1998 | Dippold |
| 5,853,700 A | 12/1998 | Gormley |
| 6,187,067 B1 | 2/2001 | Guimaraes |
| 6,318,615 B1 | 11/2001 | Walter |
| 6,607,567 B1 | 8/2003 | Towfighi |
| 6,800,104 B2 | 10/2004 | Rosenbaum |
| 7,661,568 B2 | 2/2010 | Vanstaan et al. |
| 8,205,777 B2 | 6/2012 | Nishikawa et al. |
| 8,302,831 B2 | 11/2012 | Taylor et al. |
| 8,826,792 B1 * | 9/2014 | Granger .................. F41A 1/06 |
| | | 89/7 |
| 2002/0005010 A1 | 1/2002 | Rosenbaum |
| 2002/0023539 A1 * | 2/2002 | Tange .................. F17C 11/007 |
| | | 95/143 |
| 2002/0092290 A1 * | 7/2002 | Herdy, Jr. .............. C06B 47/04 |
| | | 60/218 |
| 2003/0051394 A1 | 3/2003 | Towfighi |
| 2004/0256037 A1 | 12/2004 | Towfighi |
| 2006/0129009 A1 | 6/2006 | Nishikawa |
| 2006/0186230 A1 | 8/2006 | Adams |
| 2013/0263821 A1 * | 10/2013 | Mavinahally .......... F02B 63/02 |
| | | 123/434 |

OTHER PUBLICATIONS

International Search Report and Written Opinion for International Application No. PCT/US2015/067323, dated Jul. 29, 2016 (16 pages).

New Zealand First Examination Report for New Zealand Application No. 734132, dated Feb. 13, 2018 (4 pages).

* cited by examiner

FUEL AND PROPELLANT COMPOSITION FOR COMBUSTION TOOLS

PRIORITY

This patent application is a continuation of and claims priority to and the benefit of U.S. patent application Ser. No. 14/631,314, which was filed on Feb. 25, 2015, the entire contents of which is incorporated herein by reference.

BACKGROUND

The subject of this invention is fuel and propellant composition of fuel containers/cells, used for gas combustion powered tools, including powered fastener driving tools, and more specifically changes to the formulations of such fuels for enhancing tool performance.

Combustion powered fastening tools are widely used in construction and other industries and many consumer applications. Suitable examples of such tools are described in U.S. Pat. Nos. 4,403,722; 4,483,474; 4,522,162; and 8,302,831, all of which are incorporated by reference. Combustion tools are usually powered by liquefied hydrocarbon fuel, stored in aerosol dispensers, sometimes called fuel cells, containers or cartridges, delivering fuel in aerosol form to a tool combustion chamber to be mixed with air and ignited to combust and provide energy for inserting a fastener into a work piece. Inside the fuel cell container, the fuel is stored in a flexible bag or pouch with an outlet valve configured for connection with a fuel delivery system for metering doses of fuel to the combustion chamber. Exemplary fuel cells are described in U.S. Pat. Nos. 5,115,944 and 7,661,568 which are incorporated by reference.

Usually, the fuel contained in a collapsible bag of such fuel cells includes a single component or a mixture of two or more components, typically liquefied hydrocarbon gases, plus a small amount of a lubricant. A propellant, contained within the cell but outside the collapsible fuel bag, is usually also a single component or a mixture of two or more liquefied hydrocarbons, in combination with air, nitrogen, or other gases. The propellant has a higher vapor pressure than the fuel pressure and maintains the fuel in a liquefied state during operation.

One commonly used fuel used to power combustion powered fastening tools, on market since 2001, is a two-component fuel sold by ITW Paslode. The ITW fuel includes as its main components, propylene (137 psig at 21° C.) and 1-butene, mixed in different percentages to meet local conditions and regulation requirements of particular markets. The highest vapor pressure mix of this fuel family is known at 90 psig at 21° C. A variation with a three-component fuel also has vapor pressure at 90 psig at 21° C. The propellant in these cases is propylene with or without atmospheric air. Conventional fuel cell fuels do not have vapor pressures exceeding 90 psig at 21° C.

U.S. Pat. No. 8,205,777 describes the work of a fuel cell/container, and claims fuel formulations of 40-95% of 1-butene plus 60-5% of propane and also 56-96% of 1-butene plus 44-4% of propylene. For the purpose of this application, it should be noticed that in the '777 patent, none of the claimed combinations produces fuel with vapor pressure higher than 82 psig at 21° C.

U.S. Pat. No. 6,800,104 discloses a combustion tool fuel composition having a fragrance to mask the often unpleasant odor of conventional fuels. While dealing mostly with fuel fragrances of 3-component fuels, this reference fails to disclose fuel component combinations to exceed 90 psig at 21° C. Notably, propylene is disclosed in the preferred composition in approximately 10 percent by weight.

A common problem of users of combustion tools is that tool performance degrades as temperatures fall. It has been found that the rate of tool misfire increases at lower temperatures, usually below 40° F./5° C. These performance problems make the tool less desirable to users, who need to work efficiently in a variety of weather conditions.

Thus, there is a need for an improved combustion tool fuel that enhances tool performance at low temperatures.

SUMMARY

The present invention specifically addresses the issue of improving performance of combustion powered tools, especially at lower ambient temperatures. By providing an improved fuel cell fuel mixture, the present fuel has been found to improve combustion tool performance at lower temperatures by reducing the percentage of missed shots, and in some conditions, missed shots were eliminated.

Combustion fuel cells typically store the fuel in pressurized liquid form. In a typical work cycle of a combustion tool, a metered dose of fuel is released from the fuel container/valve for each cycle/shot. The fuel travels under its own pressure through the delivery system of the tool and is ultimately injected into a combustion chamber in the tool. As the boiling point/temperature of fuel is usually lower than the air temperature in the combustion chamber, the fuel evaporates, and mixes with the air. Combustion occurs for driving the fastener once the user pulls the trigger and causes a spark to be generated by the tool spark plug.

A proper mix of air and vaporized fuel, characterized by the air-fuel ratio, at this point must be present in the spark plug vicinity. Proper ignition requires that the air/fuel mix reaches the proper ratio. So, the time needed for fuel to travel from the valve to, and evaporate in, the combustion chamber and the spark plug area is critical. If the fuel takes too long to reach the combustion chamber, tool performance will be sluggish and unacceptable to a user.

Thus, since the fuel travel time and evaporation is temperature dependent, combustion tool performance is enhanced at higher ambient temperature, when fuel evaporates faster. In conventional combustion tools, these operational characteristics hinder low temperature performance and reduce user productivity.

It has been found that fuels having higher vapor pressure/lower boiling points, are able to travel relatively faster to the combustion chamber and evaporate more quickly at lower temperatures. More specifically, a combustion tool fuel cell having enhanced low temperature operation is provided and includes a fuel composition having at least one hydrocarbon component with a total vapor pressure equal or above 95 psig at 21° C.

In another embodiment, a propellant is provided for use in a combustion tool fuel cell comprising at least one hydrocarbon component with a total vapor pressure equal or above 140 psig at 21° C., In a further embodiment, a combustion tool fuel cell fuel composition is provided, including a fuel having a vapor pressure of at least 95 psig at 21° C., the fuel including at least 53 weight percent of one of propylene and propane; and a propellant having at least one hydrocarbon component with a total vapor pressure equal or above 140 psig at 21° C.

Another design factor in providing an effective combustion tool fuel relates to the propellant. Combustion tool fuel cells typically include a propellant enclosed in a second compartment separate from the fuel. Providing a pressure difference between the propellant and the fuel through a variety of work conditions during the operational life of the fuel container is usually a challenge, especially within the can/container strength constrains. This invention provides formulations of propellants to support the proposed "boosted" fuel for two and more compartment fuel cells/containers.

DETAILED DESCRIPTION

Figure 1:
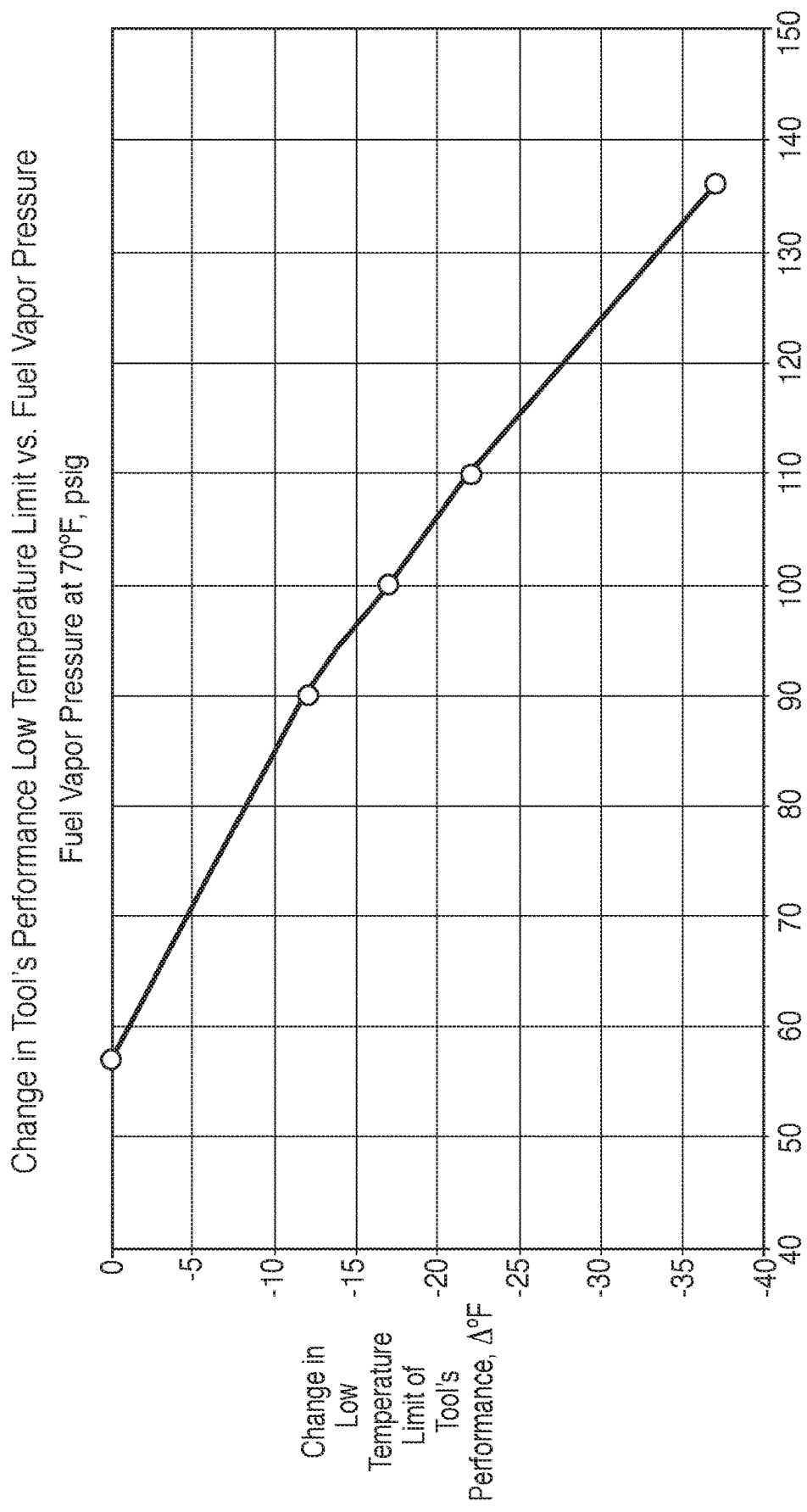
FIG. 1 is a graphic representation of changes in combustion tool performance at various temperatures compared based on fuel vapor pressure.

The present inventor has found that combustion tool performance at low temperatures is significantly improved when the fuel in the fuel cell has a total vapor pressure at or above 95 psig at 21° C. In the present application, "total vapor pressure" refers to a combined vapor pressure value for all of the various fuel ingredients or constituents. In some cases, the fuel is a blend of various ingredients, such as propylene or propane and n-butane or 1-butene. In other cases, the fuel is a single ingredient, such as propylene or propane.

As is known in the art, the main ingredients of combustion tool fuel cell fuel include but are not limited to propylene, propane and MAPP gas, which itself is a blend of gases well known in the art. For the purpose of this application, "MAPP gas" includes other similar "naturally" derived multi-component hydrocarbon mixtures. Standard combustion tool fuel, referred to as the control in the present application, is also referred to as FUEL 90. This fuel comprises as its main ingredients propylene at 52 weight %, and 1-butene at 48 weight %, and is commercially available from ITW-Paslode. The "90" refers to the total gas vapor pressure. It was found that the tool users desire to be able to work at even lower ambient temperatures than they can now with fuels/cells currently available on the market.

In one embodiment of the invention, a single hydrocarbon component with a vapor pressure equal or above 95 psig at 21° C. is used. This can be, but not limited to, propylene with a vapor pressure of 136 psig, propane with a vapor pressure of 109 psig, MAPP gas with a vapor pressure of 98 psig (all at 21° C.) or similar "naturally" derived multi-component hydrocarbon mixtures having suitable vapor pressure values.

In another embodiment, a fuel composition includes two components, one of them being propylene in the amount of 53 weight % or above and the remainder is, but not limited to, either 1-butene, n-butane or isobutane, or a mix of them. Another suitable embodiment of fuel composition in this case is the mix of 63 weight % or above of propane and the rest is, but not limited to, either 1-butene, n-butane or isobutane, dimethyl ether or a mix of them. In a still further preferred embodiment, a fuel composition includes propylene in the amount of 43 weight % or above and the rest is dimethyl ether at 61 psig at 21° C.

One preferred embodiment of fuel composition in this case is the mix of 55 weight % or above of propane and the rest is dimethyl ether. In one embodiment, a fuel composition consists of propane in the amount of 76 weight % or above and the rest is, but not limited to, either 1-butene, n-butane or isobutane, or a mix of them. In a further embodiment of fuel composition in this case is the mix of 90 weight % or above of propane and the rest is, but not limited to, either 1-butene, n-butane or isobutane, or a mix of them. In another embodiment of the invention, a fuel composition consists of propane in the amount of 90 weight % or above and the rest is dimethyl ether.

In addition to having a fuel with a high vapor pressure, a preferred type of propellant composition is provided with 1, 2 or more hydrocarbon components with a total vapor pressure equal or above 140 psig at 21° C. In one embodiment, a propellant composition includes ethane, acetylene, or a mix of them as one of the primary components. A preferred embodiment of propellant composition in this case is the mix of 10 weight % or above of ethane with the balance of components, bringing the total vapor pressure to 170 psig or above. In another embodiment of the invention, a propellant composition contains 1, 2 or more hydrocarbon components and a compressed gas at or over 15 psig (before filling). In the latter case, the propellant composition in this case includes hydrocarbon components and either nitrogen, air or carbon dioxide or a mix of them at 15 psig or above pressure.

Referring now to FIG. 1, tests were conducted using two models of combustion fastening nailers. The tools were each placed in a temperature-controlled chamber, and fired repeatedly at a speed of one shot every 2 seconds using each of several test blends of fuel. The control fuel was FUEL 90 described above. Another test fuel was FUEL 110 having 71 weight percent propylene and 29 weight percent 1-butene. Yet another test fuel was FUEL 136, with propylene as the major ingredient. FIG. 1 plots in summary fashion fuel vapor pressure at room temperature, 70° F. or 21° C., against a change in low temperature limit of a tools performance. It will be seen that as fuel vapor pressure increases, the combustion tool is able to work more effectively at lower temperatures.

Figure 2:
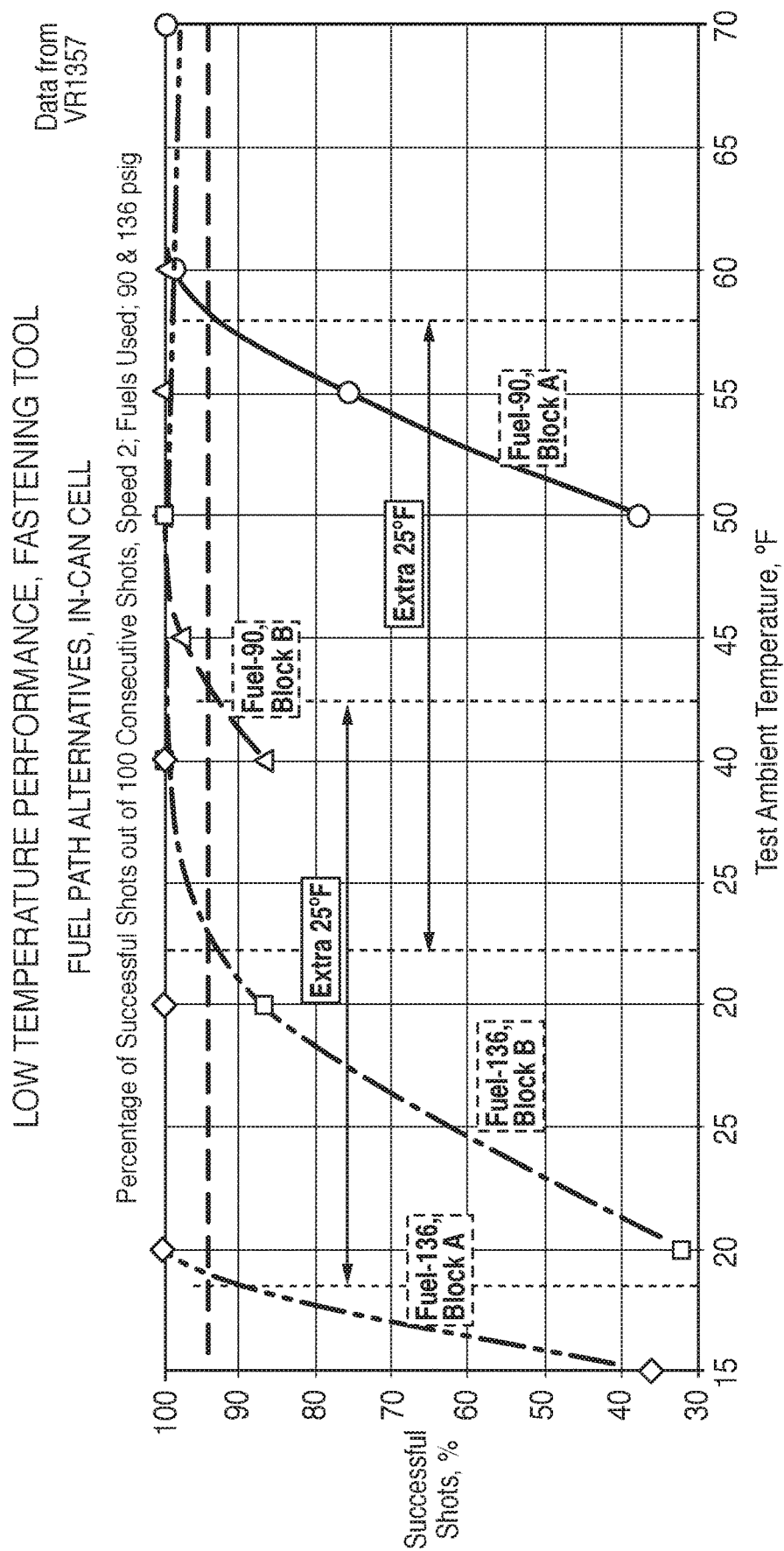
FIG. 2 is a plot of low temperature tool performance for various fuel mixtures plotted as percentage successful shots against temperature.

Referring now to FIG. 2, actual data points of the two tools designated Block A and Block B due to their structural configurations relating to the fuel delivery system, are shown each with FUEL 136 and FUEL 90. Tool performance is plotted as the percentage of successful shots out of 100 consecutive shots. In this graph, 94 percent successful shots was arbitrarily used as the measure of a successful operational session. It will be seen that exchanging FUEL 90 for FUEL 136 resulted in an extra 25° F. of efficient tool operation, extending down to the range of 20° F.

Figure 3:
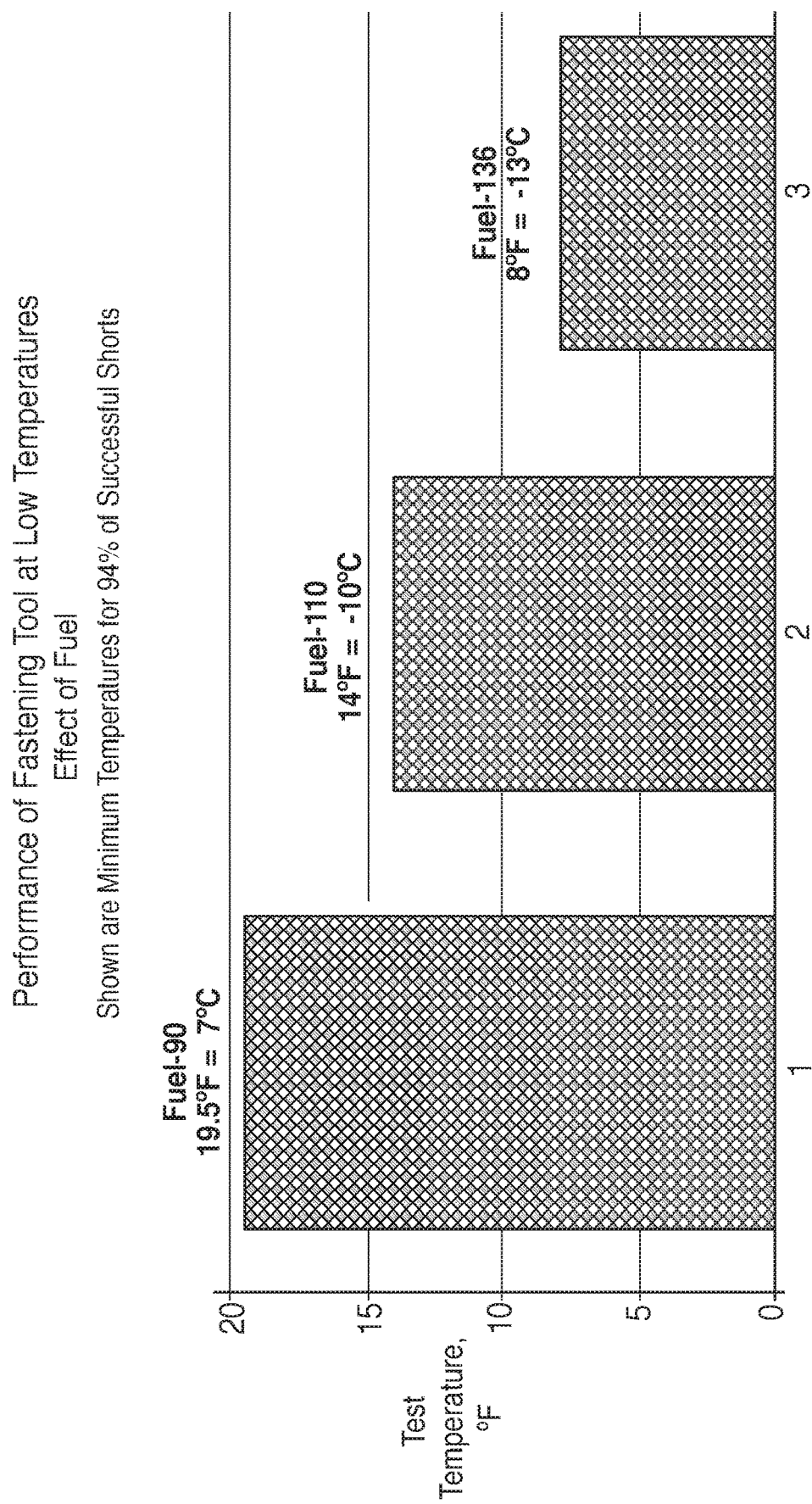
FIG. 3 is a graphical representation of tool performance at various temperatures and using various fuel mixtures.

Referring now to FIG. 3, a comparison of FUEL 90, FUEL 110 and FUEL 136 is shown. In this case, using the same test combustion tool with all three fuels, FUEL 110 provided a decrease of about 5° F. in operational temperature, while FUEL 136 provided a reduction of about 12° F. in operational temperature. Thus, results clearly show that by changing only fuel vapor pressure with everything else being the same provides a significant improvement in tool low temperature performance.

While the embodiments of the present combustion tool fuel mixture disclosed above are presently considered to be preferred, various modifications and improvements are contemplated without departing from the spirit and scope of the invention. The scope of the invention is presented by the following claims.

The invention claimed is:

1. A combustion tool fuel cell having enhanced low temperature operation, said combustion tool fuel cell comprising:

a first compartment enclosing a fuel composition having a total vapor pressure equal to or above 95 psig at 21° C., said fuel composition consisting of a single hydrocarbon component selected from the group consisting of propylene and propane; and a second compartment enclosing a combustion tool fuel cell propellant, wherein said combustion tool fuel cell propellant has a total vapor pressure equal to or above 140 psig at 21° C., said combustion tool fuel cell propellant comprising ethane, acetylene, or a mix thereof;

wherein said second compartment is separate from said first compartment;

wherein the combustion tool fuel cell is configured for connection to a fuel delivery system of a combustion tool to provide enhanced low temperature operation.

2. The combustion tool fuel cell of claim 1, wherein the single hydrocarbon component is propylene.

3. The combustion tool fuel cell of claim 1, wherein the single hydrocarbon component is propane.

4. The combustion tool fuel cell of claim 1, wherein the combustion tool fuel cell propellant comprises ethane.

5. The combustion tool fuel cell of claim 1, wherein the combustion tool fuel cell propellant comprises acetylene.

6. The combustion tool fuel cell of claim 1, wherein the combustion tool fuel cell propellant comprises a mix of ethane and acetylene.

* * * * *